(12) United States Patent
Chen et al.

(10) Patent No.: US 7,299,933 B2
(45) Date of Patent: Nov. 27, 2007

(54) FASTENING DEVICE FOR DATA STORAGE DEVICES

(75) Inventors: Hsuan-Tsung Chen, Tu-Chen (TW); Ying Sin (William) Tin, Shenzhen (CN); Pin-Shian Wu, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 475 days.

(21) Appl. No.: 10/982,420

(22) Filed: Nov. 5, 2004

(65) Prior Publication Data

US 2005/0103729 A1    May 19, 2005

(30) Foreign Application Priority Data

Nov. 14, 2003  (TW) .............................. 92220210 U

(51) Int. Cl.
*A47F 7/00* (2006.01)
(52) U.S. Cl. ...................................................... 211/26
(58) Field of Classification Search .................. 211/26; 361/679–685, 724–726; 312/223.1, 223.2
See application file for complete search history.

(56) References Cited

U.S. PATENT DOCUMENTS

| | | | |
|---|---|---|---|
| 5,510,955 A | 4/1996 | Taesang | |
| 6,238,026 B1 * | 5/2001 | Adams et al. | 312/223.2 |
| 6,667,880 B2 * | 12/2003 | Liu et al. | 361/685 |
| 6,801,427 B2 * | 10/2004 | Gan et al. | 361/685 |
| 6,853,549 B2 * | 2/2005 | Xu | 361/685 |
| 7,035,099 B2 * | 4/2006 | Wu | 361/685 |
| 2004/0144737 A1 * | 7/2004 | Lindenbeck et al. | 211/26 |
| 2005/0087504 A1 * | 4/2005 | Wu | 211/26 |

* cited by examiner

*Primary Examiner*—Jennifer E. Novosad
(74) *Attorney, Agent, or Firm*—Wei Te Chung

(57) ABSTRACT

A fastening device (40) for securing data storage devices (30) includes a drive bracket (10), and a fixing plate (20). The drive bracket includes two sidewalls (11) defining grooves (12) for slidably receiving screws (32) engaged in opposite sides of each data storage device. One of the sidewalls comprises two supporting tabs (18, 19) each defining a pivot aperture (13, 17). The fixing plate includes two locking blocks (29) defined in a first portion (26) thereof, two resilient members (25) stamped from a second portion (28) thereof, and two opposite pivot axes (21) extending outwardly from a flange (22) thereof. The locking blocks are corresponding to the grooves defined in the sidewall, and the pivot axes are engaged with the pivot apertures. The fixing plate can pivot about the supporting tabs, thereby the data storage devices can be readily received in or removed out from the drive bracket.

18 Claims, 6 Drawing Sheets

FASTENING DEVICE FOR DATA STORAGE DEVICES

BACKGROUND OF THE INVENTION

1. Field of the Invention

The present invention relates to a fastening device, and particularly to a fastening device that readily attach data storage devices in a bracket.

2. Description of Prior Art

Various data storage devices are installed in a computer for communication and handling data. Conventionally, a computer data storage device is directly secured to a bracket of the computer using screws. Installation and removal of screws requires a tool. This is unduly complicated and laborious, and reduces the efficiency of assembly in mass production facilities.

A common way to overcome the above shortcomings is to have a pair of rails formed in opposite side walls of a bracket. Such rails are disclosed in U.S. Pat. No. 5,510,955. A bracket has two pair of leader rails on opposite sides thereof. Each pair of leader rails defines a pair of first coaxial holes. A pair of guide rails is respectively attached to opposite sides of a data storage device with bolts. Each guide rail comprises a pair of flanges defining a pair of second coaxial holes. The assembly of the storage device and the guide rails is inserted into the drive bracket by sliding the guide rails along the leader rails. A pair of locking pins is then extended through the first and second coaxial holes to thereby secure the storage device within the bracket. However, mounting the rails to the data storage device with bolts is unduly complicated and time-consuming. Furthermore, the bracket can only accommodate one storage device therein.

A new fastening device for data storage devices that overcomes the above-mentioned problems is desired.

SUMMARY OF THE INVENTION

An object of the present invention is to provide a fastening device having a fixing plate which can readily attach data storage devices within a drive bracket.

In order to achieve the above object, a fastening device in accordance with a preferred embodiment of the present invention comprises a drive bracket for installing data storage devices therein, and a fixing plate. The drive bracket comprises two sidewalls defining two pairs of grooves for slidably receiving screws that are engaged in opposite sides of the data storage devices. One of the sidewalls comprises a pair of supporting tabs each defining a pivot aperture. The fixing plate comprises a pair of locking blocks defined in a first portion thereof, a pair of resilient members stamped from a second portion thereof, and a pair of opposite pivot axes extending outwardly from a flange thereof. The locking blocks are corresponding to the grooves defined in said sidewall of the drive bracket, and the pivot axes are engaged with the pivot apertures of the drive bracket. The fixing plate can pivot about the supporting tabs, thereby the data storage devices can be readily received in or removed out from the drive bracket.

Other objects, advantages and novel features of the present invention will become more apparent from the following detailed description when taken in conjunction with the accompanying drawings, in which:

DESCRIPTION OF THE PREFERRED EMBODIMENT

Reference will now be made to the drawings to describe the present invention in detail.

Figure 1:
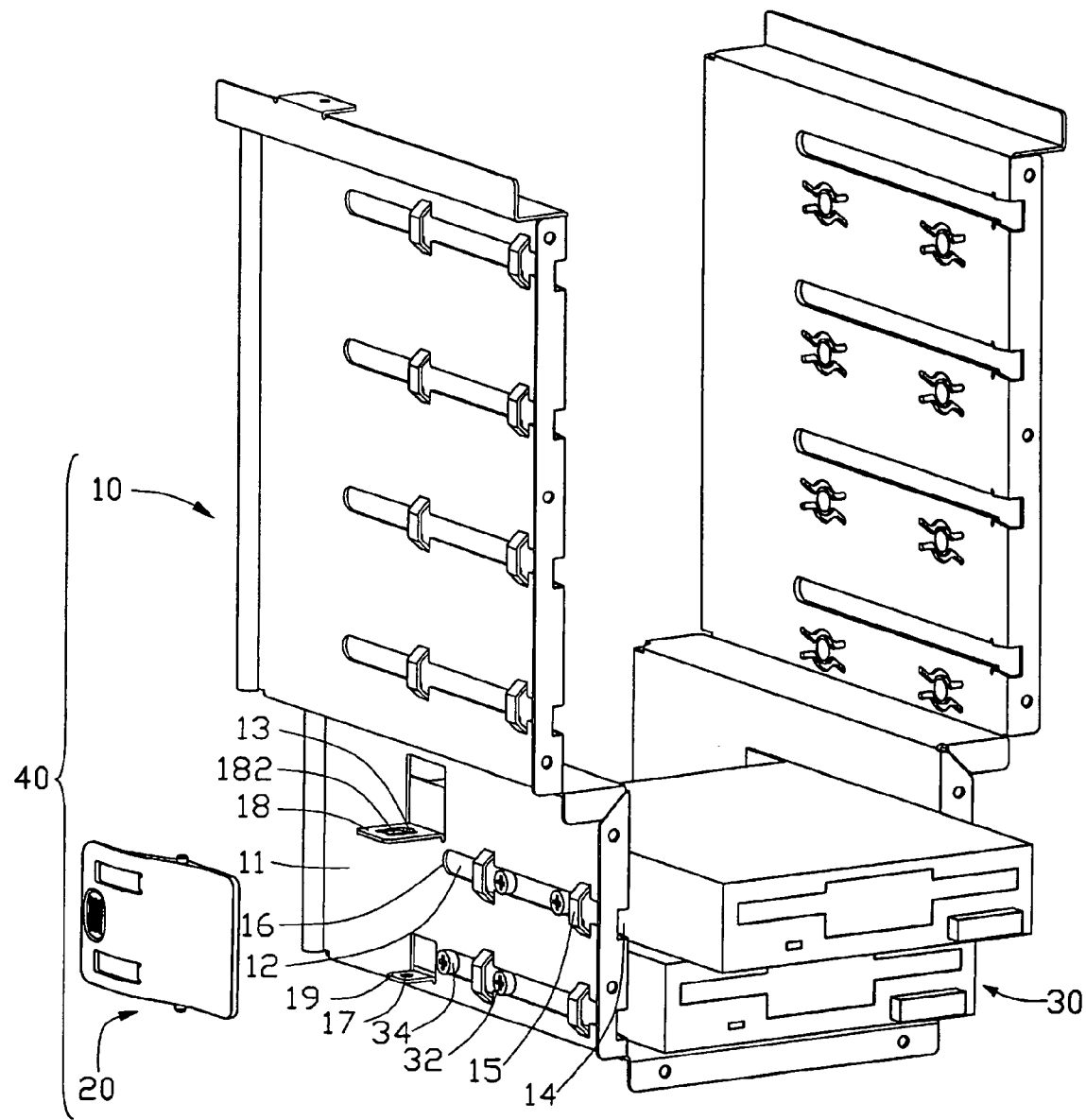
FIG. 1 is an exploded, isometric view of a fastening device in accordance with a preferred embodiment of the present invention, together with a pair of data storage devices received in a bracket of the fastening device.

FIG. 1 shows a fastening device 40 in accordance with the preferred embodiment of the present invention, together with a pair of data storage devices 30. The fastening device 40 comprises a drive bracket 10 and a fixing plate 20. A pair of screws 32 is threadedly engaged in opposite sides of each data storage device 30 respectively. Each screw 32 has a screw cap 34.

The drive bracket 10 comprises a pair of opposite sidewalls 11. Two pairs of opposite grooves 12 are defined in the two sidewalls 11, each groove 12 being for slidably receiving the screws 32 of the data storage device 30. Each groove 12 comprises a stop end 16 formed in a rear end thereof and a guiding entrance 14 defined in a front end thereof, the guiding entrance 14 for facilitating sliding entry of the corresponding screws 32 of the data storage devices 20. A pair of parallel supporting tabs 18, 19 is stamped from one of the sidewalls 11, the supporting tabs 18, 19 adjacent to the corresponding stop ends 16 of the grooves 32 respectively. The supporting tab 18 comprises a lingulate tab 182 formed in a middle portion thereof and a first pivot aperture 13 proximate to a bottom portion of the lingulate tab 182, the lingulate tab 182 for facilitating installing the fixing plate 20 to the drive bracket 10. The supporting tab 19 defines a second pivot aperture 17 in alignment with the first pivot aperture 13. Each groove 12 has a pair of separate reinforcing ribs 15 formed vertically across thereon, a structural strength of the groove 12 is thus increased.

Figure 2:
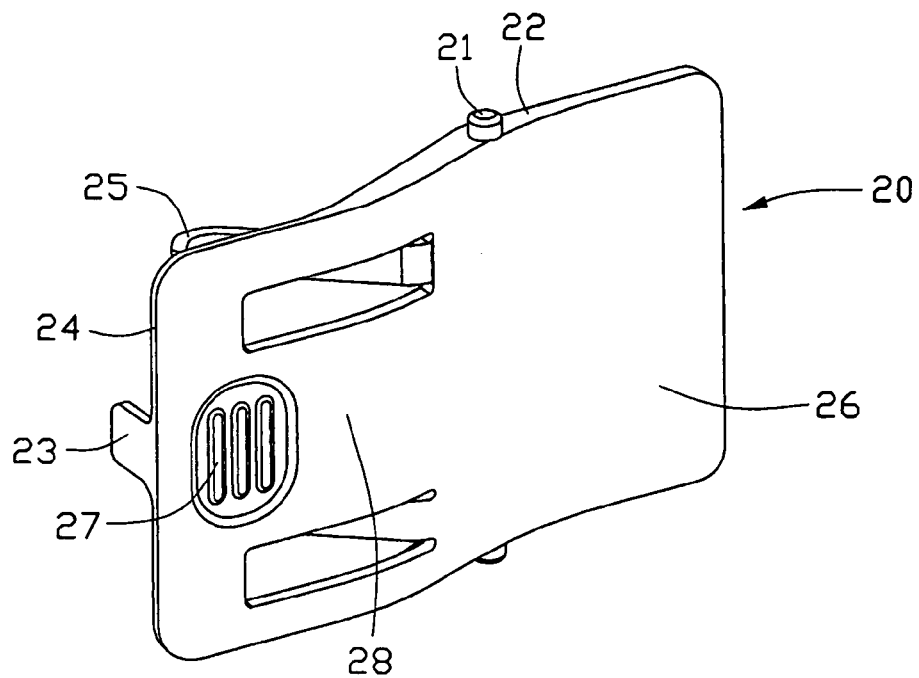
FIG. 2 is an enlarged view of a fixing plate of the fastening device of FIG. 1.
Figure 3:
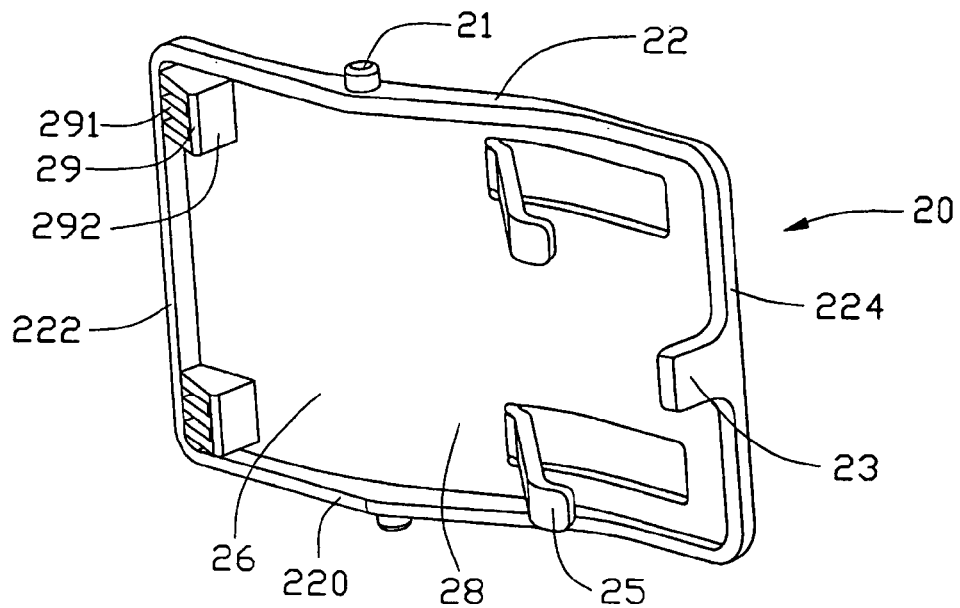
FIG. 3 is an inverted view of FIG. 2.

Referring also to FIGS. 2 and 3, the fixing plate 20 is to be pivotally mounted between the two supporting tabs 18, 19 of said sidewall 11. The fixing plate 20 comprises a first portion 26, a second portion 28 extending from an end of the first portion 26, and a flange 22 extending inwardly from edges of the first and second portions 26, 28. The flange 22 comprises a pair of first flanges 220, a second flange 222 interconnecting the first flanges 220, and a third flange 224 opposite to the second flange 222 and interconnecting the first flanges 220. The first and second portions 26, 28 are not coplanar. The first portion 26 has a pair of separate locking blocks 29 extending inwardly from a bottom face of a distal end thereof, the locking blocks 29 corresponding to the grooves 12 defined in said sidewall 11 of the drive bracket 10 respectively. Each locking block 29 is substantially wedge-shaped, and comprises a guiding member 291 and a stop member 292. The guiding member 291 is a slope, and a lower portion of the guiding member 291 is flush with a bottom edge of the second flange 222. A pair of resilient members 25 is stamped from the second portion 28, for facilitating the fixing plate 20 securing the data storage devices 30 in use. The resilient members 25 are adjacent to the first portion 26. A plurality of ridges 27 is formed in a top face of a distal end of the second portion 28, for facilitating operating the fixing plate 20. A pair of coaxial pivot axes 21 each extends outwardly from an outer surface of a respective first flange 22, engaging with the first and second pivot apertures 13, 19 of the drive bracket 10 respectively. A locating projection 23 depends inwardly from a middle of the third flange 28, for preventing an excessive deformation of the resilient members 25.

Figure 4:
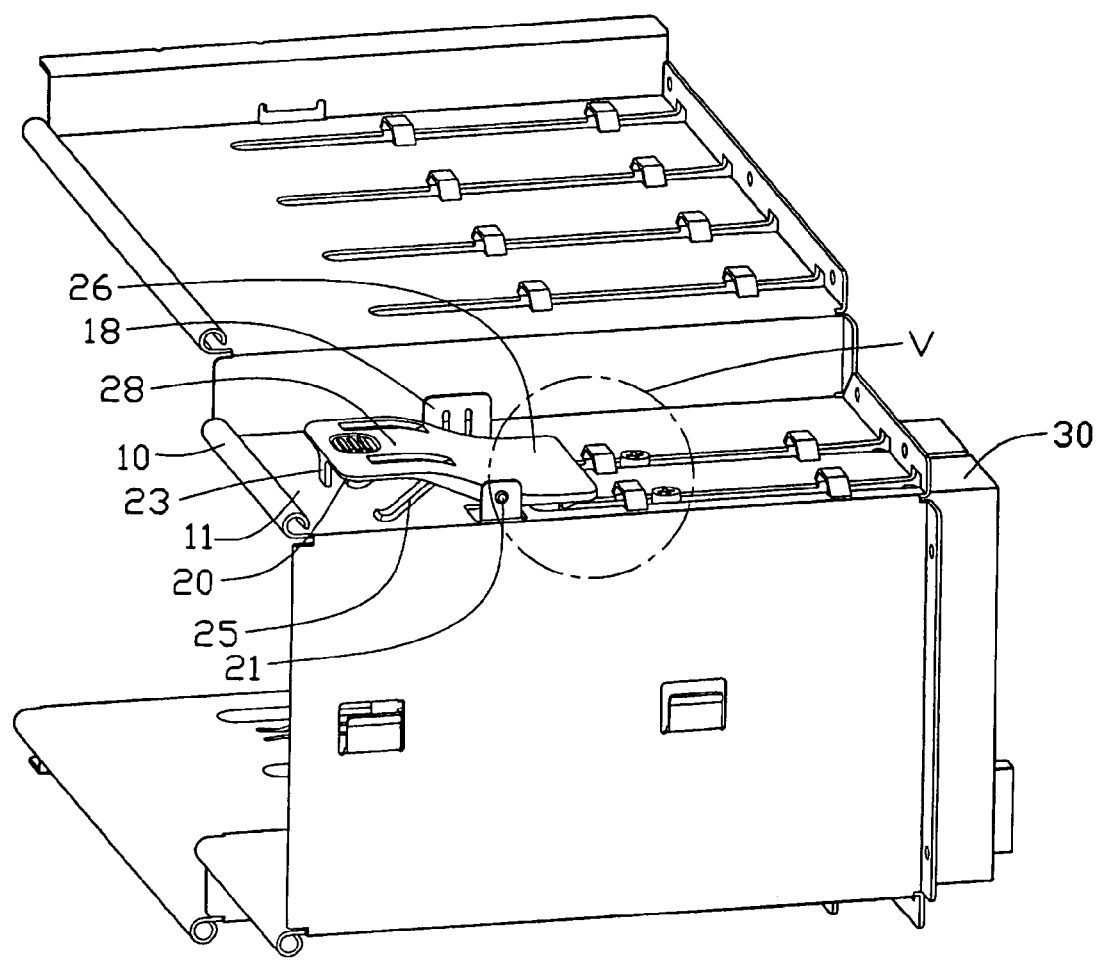
FIG. 4 is an assembled view of the fixing plate and the bracket of the fastening device of FIG. 1, but viewed from another aspect.
Figure 5:
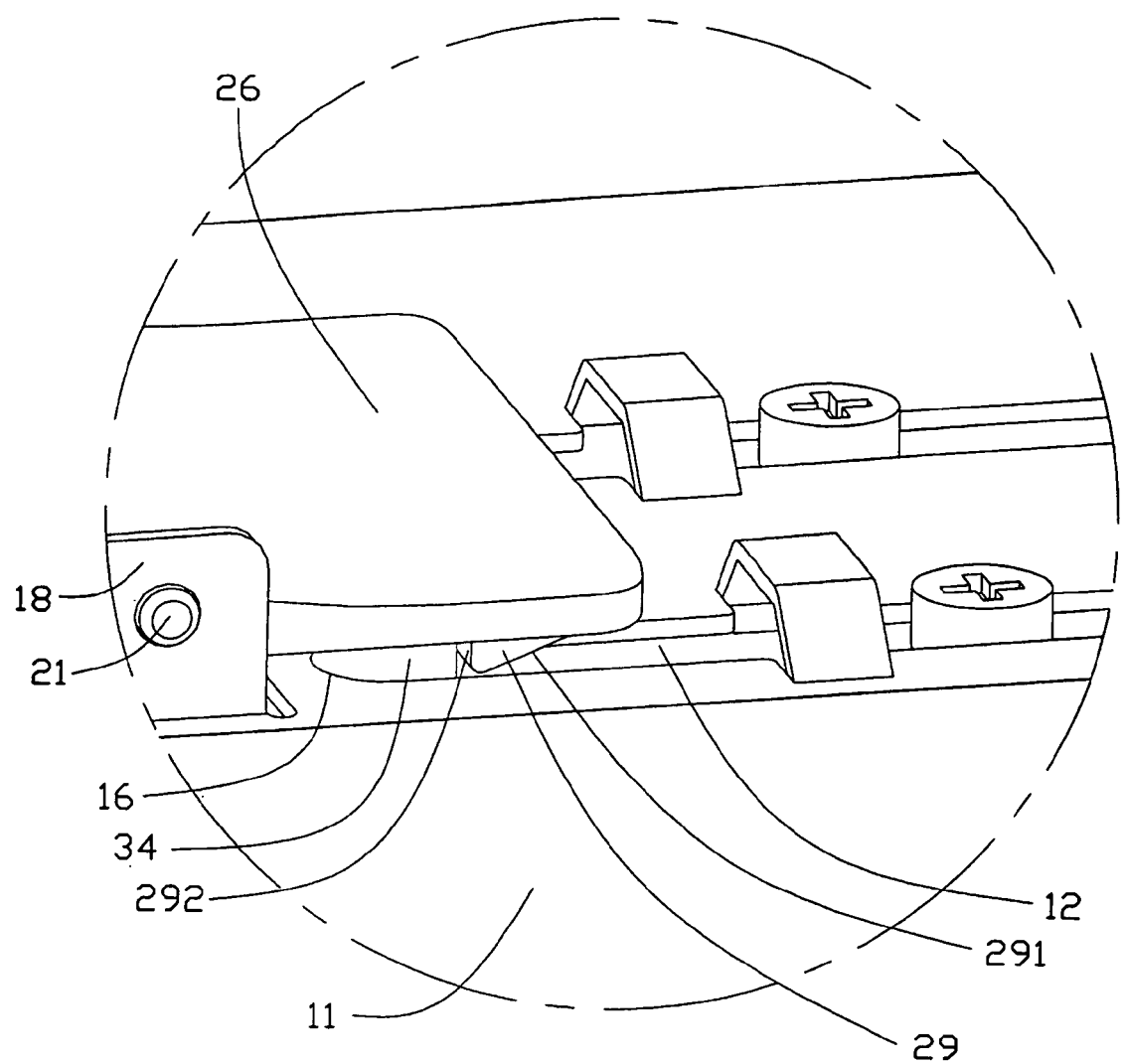
FIG. 5 is an enlarged view of a circle portion V of FIG. 4.

Referring also to FIGS. 4 and 5, in assembly, the resilient members 25 of the fixing plate 20 face to said sidewall 11 of the drive bracket 10, and the first portion 26 is adjacent to said grooves 12 of the drive bracket 10. One of the pivot axes 21 of the fixing plate 20 is pivotally received in the second pivot aperture 17 of the supporting tab 19 of the drive bracket 10, then, the other pivot axis 21 of the fixing plate 20 rides the lingulate tab 182 of the supporting tab 18 of the drive bracket 10 off its original position and is pivotally received in the first pivot aperture 13 of the supporting tab 18. Thus, the fixing plate 20 is pivotally attached to said sidewall 11 of the drive bracket 10. After assembly, the lingulate tab 182 of the supporting tab 18 returns its original position, and the resilient members 25 of the second portion 28 and the first portion 26 of the fixing plate 20 abut against said sidewall 11 of the drive bracket 10.

In use, the data storage devices 20 are slid into the drive bracket 10. The screws 32 of the data storage devices 20 respectively enter the grooves 12 of the drive bracket 10 via the guiding entrances 14. When a leading screw 32 of the screws 32 of each data storage devices 20 exerts force on a corresponding guiding member 291 of the locking block 29, the resilient members 25 are compressed, and the fixing plate 20 pivot about the supporting tabs 18, 19. When said leading screw 32 arrives a corresponding stop end 16 of the groove 12, said leading screw 32 has slid beyond a corresponding stop member 292 of the locking block 29. At the same time, the resilient members 25 are decompressed, and the fixing plate 20 returns to its original position. Thus, said leading screw 32 is sandwiched between said stop end 16 and said stop member 292, thereby securing a corresponding data storage device 30 within the drive bracket 10.

In removal of said data storage device 30, the second portion 28 of the fixing plate 20 is pressed, and the resilient members 25 are compressed to cause the fixing plate 20 to pivot about the pivot axes 21. When a distance of a lowest point of each locking block 29 to the sidewall 11 of the drive bracket 10 is slightly greater than a height of the screw cap 34 of said leading screw 32, said leading screw 32 is released from said stop member 292 of the locking block 29. Then, said data storage device 30 is readily slid out from the drive bracket 20.

During the above use and removal procedure, the locating projection 23 of the fixing plate 20 prevents the resilient members 25 from being elastically deformed too far. When each resilient member 25 is elastically deformed as far as it is permissible, the locating projection 23 abuts against the sidewalls 11 of the drive bracket 10. Thus, the resilient member 25 is protected from excessive deformation.

Figure 6:
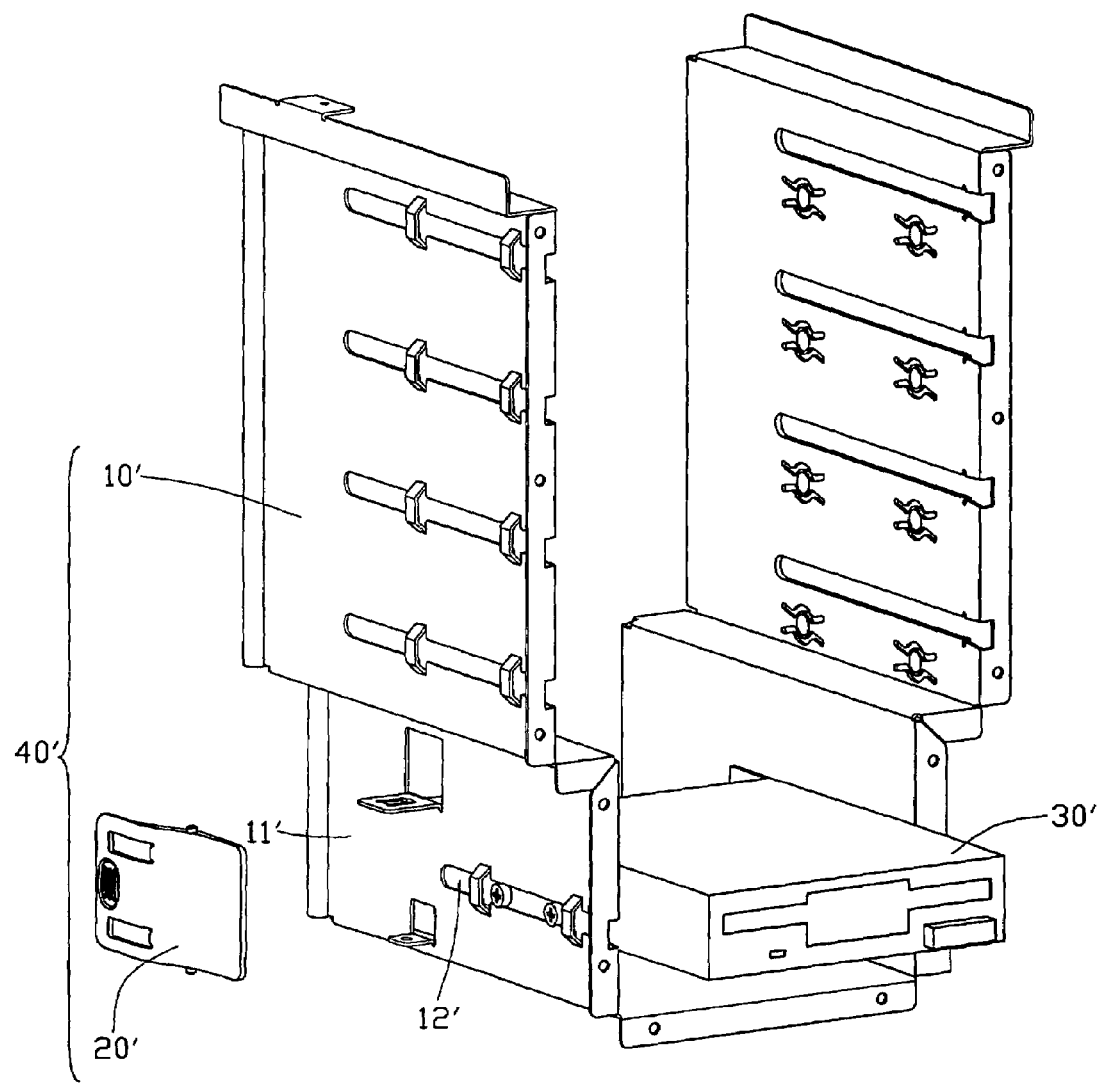
FIG. 6 is an exploded, isometric view of a fastening device in accordance with an alternative embodiment of the present invention, together with a data storage device received in a bracket of the fastening device.
Figure 7:
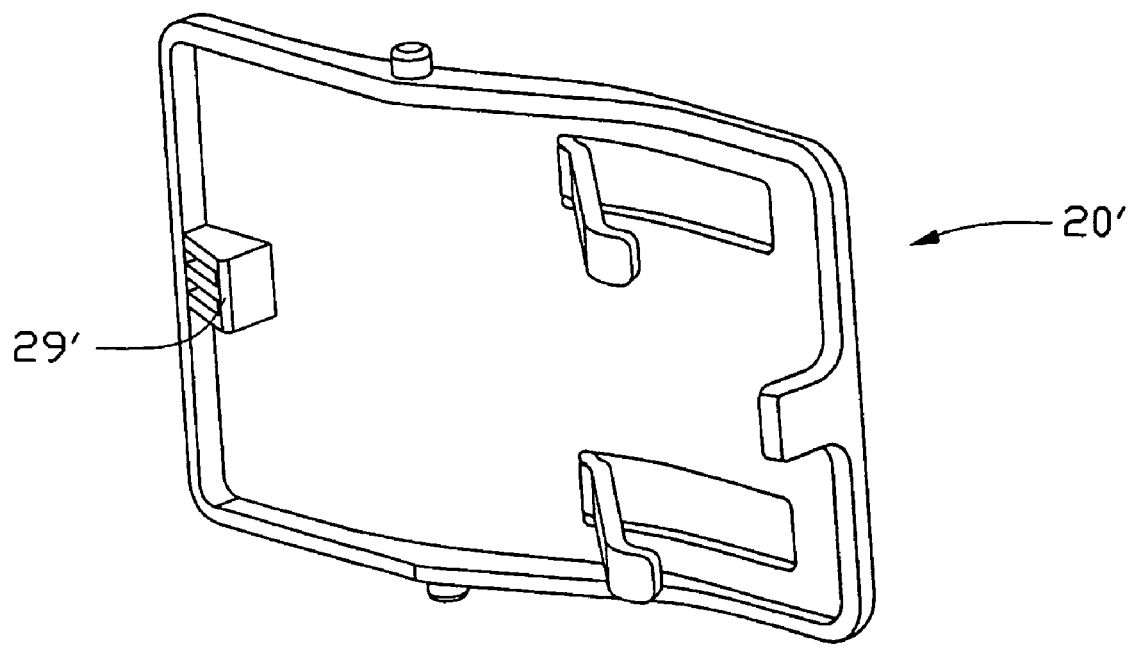
FIG. 7 is an enlarged, inverted view of a fixing plate of the fastening device of FIG. 6.

Referring to FIGS. 6 and 7, a fastening device 40' in accordance with an alternative embodiment of the present invention comprises a drive bracket 10' and a fixing plate 20'. Compared with the preferred embodiment, a data storage device 30' received in the drive bracket 10'. Simultaneously, the drive bracket 10' defines a pair of grooves 12' in opposite sidewalls 11' thereof, and the fixing plate 20' has a locking block 29' 10' corresponding to one of the grooves 12' of the drive bracket 10'.

The number of the locking block 29 of the fixing plate 20 is changeable according to the data storage device 30. The screws 32 which are threadedly attached to opposite sides of the data storage device 30 can be replaced by posts arranged on opposite sides of the data storage device 30.

While preferred embodiments in accordance with the present invention have been shown and described, equivalent modifications and changes known to persons skilled in the art according to the spirit of the present invention are considered within the scope of the present invention as defined in the appended claims.

What is claimed is:

1. A fastening device for securing a data storage device having a plurality of posts arranged on opposite sides thereof, the fastening device comprising:
  a drive bracket for installing the data storage device therein, the drive bracket comprising a pair of sidewalls defining a pair of grooves for slidably receiving the posts of the data storage device, each of the grooves having a stop end, one of the sidewalls comprising a pair of supporting tabs; and
  a fixing plate pivotally attached to said sidewall, the fixing plate comprising a first portion, and a second portion extending from an end of the first portion, the first portion comprising a locking block corresponding to one of the grooves, the second portion comprising a resilient member having a distal end abutting against said sidewall; wherein
  when the posts of the data storage device are slid into the grooves, one of the posts is slid past the locking block and is sandwiched between the locking block and the stop end of said groove, thereby securing the data storage devices within the drive bracket; when the second portion is pressed, the fixing plate is pivoted about the supporting tabs, and said post is released from the locking block, thereby readily removing the data storage device from the drive bracket.

2. The fastening device as described in claim 1, wherein the first portion and the second portion are not coplanar.

3. The fastening device as described in claim 1, wherein a stop projection depends from the second portion, for preventing an excessive deformation of the resilient member.

4. The fastening device as described in claim 1, wherein a pair of opposite axes each extends outwardly from a respective side portion of the fixing plate.

5. The fastening device as described in claim 4, wherein each of the supporting tabs defines a pivot aperture, the fixing plate is placed between the supporting tabs with the axes pivotably engaging in the pivot apertures of the supporting tabs respectively.

6. The fastening device as described in claim 1, wherein the locking block is substantially wedge-shaped, and comprises a guiding member and a stop member.

7. The fastening device as described in claim 6, wherein the guiding member has a slope for facilitating said post sliding past the stop member.

8. The fastening device as described in claim 1, wherein the resilient member is stamped from the second portion.

9. The fastening device as described in claim 1, wherein the supporting tabs are adjacent to the stop end of said groove, one of the supporting tabs having a lingulate tab.

10. A fastening device assembly comprising:
 a data storage device having a plurality of posts arranged on opposite sides thereof;
 a drive bracket for installing the data storage device therein, the drive bracket comprising a pair of sidewalls defining a pair of grooves slidably receiving the posts of the data storage device, each of the grooves having a stop end, one of the sidewalls comprising a pair of supporting tabs; and
 a fixing plate pivotally mounted between the supporting tabs, the fixing plate comprising a first portion, and a second portion extending from an end of the first portion, the first portion comprising a locking block corresponding to one of the grooves, the second portion comprising a resilient member having a distal end abutting against said sidewall, the locking block comprising a guiding member and a stop member; wherein
 when the posts of the data storage device are slid into the grooves, one of the posts is slid past the stop member and is sandwiched between the stop member of the locking block and the stop end of said groove, thereby securing the data storage devices within the drive bracket; when the second portion is pressed, the fixing plate is pivoted about the supporting tabs, and said post is released from the stop member, thereby readily removing the data storage device from the drive bracket.

11. The fastening device as described in claim 10, wherein the first portion and the second portion are not coplanar.

12. The fastening device as described in claim 10, wherein a pair of opposite axes each extends outwardly from a respective side portion of the fixing plate.

13. The fastening device as described in claim 12, wherein each of the supporting tabs defines a pivot aperture, the axes of the fixing plate pivotably engage in the pivot apertures of the supporting tabs respectively.

14. The fastening device as described in claim 10, wherein the locking block extends from a bottom surface of the first portion, and is substantially wedge-shaped.

15. The fastening device as described in claim 10, wherein the resilient member is stamped from the second portion.

16. The fastening device as described in claim 10, wherein the supporting tabs are adjacent to the stop end of said groove, one of the supporting tabs having a lingulate tab.

17. The fastening device as described in claim 10, wherein a stop projection depends from the second portion, for preventing an excessive deformation of the resilient member.

18. A fastening device assembly comprising:
 a storage device having at least one post on one side face thereof;
 a drive bracket defining a pair of side walls with at least one groove in one of said side walls corresponding to said side face, said storage device inserted into the drive bracket in a front-to-back direction and finally disposed between said pair of side walls under a condition that the post is received in the groove with a tip of the post extending beyond an outer face of the one of the side walls;
 a fixing plate pivotally attached around said outer face of said one of the side walls with at least one locking block located on one side of a pivot of said fixing plate and latchably engaged with the tip for preventing backward movement of the post, and a resilient member located on the other side of the pivot of the fixing plate and urging said fixing plate in a releasable locking position.

* * * * *